(12) United States Patent
Aoki

(10) Patent No.: US 7,545,468 B2
(45) Date of Patent: *Jun. 9, 2009

(54) LIQUID CRYSTAL DISPLAY ELEMENT, LIQUID CRYSTAL DISPLAY DEVICE, AND DISPLAY EQUIPMENT

(75) Inventor: Kengou Aoki, Kirishima (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/119,357

(22) Filed: May 12, 2008

(65) Prior Publication Data

US 2008/0266496 A1 Oct. 30, 2008

Related U.S. Application Data

(63) Continuation of application No. 11/286,691, filed on Nov. 23, 2005, now Pat. No. 7,388,635.

(30) Foreign Application Priority Data

| Nov. 26, 2004 | (JP) | ............................. 2004-343098 |
| Jan. 27, 2005 | (JP) | ............................. 2005-020255 |

(51) Int. Cl.
*G02F 1/1335* (2006.01)

(52) U.S. Cl. ...................................... 349/114; 349/106

(58) Field of Classification Search ................. 349/114, 349/106

See application file for complete search history.

(56) References Cited

U.S. PATENT DOCUMENTS

| 5,204,765 | A | 4/1993 | Mitsui et al. |
| 6,624,860 | B1 | 9/2003 | Narutaki et al. ............. 349/106 |
| 6,741,308 | B2 | 5/2004 | Ha ............................. 349/114 |
| 6,757,038 | B2 | 6/2004 | Itoh et al. .................... 349/113 |
| 6,788,367 | B2 | 9/2004 | Chang et al. ................. 349/114 |
| 6,801,274 | B2 | 10/2004 | Suzuki ....................... 349/106 |
| 6,906,765 | B2 | 6/2005 | Narutaki et al. ............. 349/106 |
| 7,388,635 | B2 * | 6/2008 | Aoki .......................... 349/114 |
| 2002/0196395 | A1 | 12/2002 | Ha |

FOREIGN PATENT DOCUMENTS

| CN | 1393727 | | 1/2003 |
| JP | 4-243226 | | 8/1992 |
| JP | 08-201802 | | 8/1996 |
| JP | 2000-267081 | * | 9/2000 |
| JP | 2001-183646 | | 7/2001 |

* cited by examiner

*Primary Examiner*—Mike Qi
(74) *Attorney, Agent, or Firm*—Hogan & Hartson LLP

(57) ABSTRACT

A reflectable metal film having a light transmission hole 5 is formed on an inner surface of a transparent substrate 2, and a light transmission region 7 and a light reflection region are arranged within each of pixel regions on the inner surface of the transparent substrate 2. A first color filter 9 and a second color filter 10 of a similar color that differs in tone are formed in each of the pixel regions. A boundary 11 between the first color filter 9 and the second color filter 10 in each of the pixel regions is positioned in the light reflection region 8 in the pixel region.

13 Claims, 11 Drawing Sheets

COLOR FILTER

COLOR FILTER

Red  Green  Blue

LIQUID CRYSTAL DISPLAY ELEMENT, LIQUID CRYSTAL DISPLAY DEVICE, AND DISPLAY EQUIPMENT

CROSS-REFERENCE TO THE RELATED APPLICATIONS

This application is a Continuation of application Ser. No. 11/286,691 filed on Nov. 23, 2005, the entire contents of which are incorporated by reference. This application also claims benefit of priority under 35 U.S.C. 119 to Japanese Patent Application No. 2004-343098 filed on Nov. 26, 2004 and Japanese Patent Application No. 2005-020255 filed on Jan. 27, 2005, the entire contents of both of which are incorporated by reference.

BACKGROUND OF THE INVENTION

1. Field of the Invention

The present invention relates to a liquid crystal display device comprising a liquid crystal display element and a backlight. Particularly, the present invention relates to a liquid crystal display device that makes a color filter structure and a reflection film structure appropriate.

2. Description of Related Art

In recent years, semi-transmission type liquid crystal display devices capable of employing both a backlight and outside light have been developed.

The semi-transmission type liquid crystal display device has the advantages of being thin, light in weight, and low in power consumption.

The semi-transmission type liquid crystal display device comprises a liquid crystal display element and a backlight arranged behind the liquid crystal display element.

The semi-transmission type liquid crystal display device is provided with a semi-transmission film that reflects a part of light.

The semi-transmission film is formed by sputtering a metal film composed of aluminum or the like on a substrate and etching alight transmission region for each pixel, and performs a function of reflection display (a reflection mode) by a region where the metal film exists, while performing a function of transmission display (a transmission mode) in a region where no metal film exists.

In the reflection mode, outside light incident from a display surface passes a color filter two times, so that coloring (spectral transformation of light) by the color filter is increased, resulting in great loss of the outside light. Therefore, brightness in the reflection mode cannot, in some cases, be sufficiently obtained.

A region, corresponding to the reflection mode, in the color filter is provided with a hole of the color filter in a predetermined area so that the brightness of reflected light is improved.

According to the semi-transmission type liquid crystal display device, it is possible to obtain an image quality having high color purity in the transmission mode, while obtaining an image quality having a high reflection factor in the reflection mode.

On the other hand, as the disadvantage of the semi-transmission type liquid crystal display device, it is difficult to simultaneously satisfy the high color purity and the high reflection factor in the reflection mode.

FIG. 16 shows the relationship between the reflection factor and the color purity (the NTSC (National Television Standards Committee) ratio) of a liquid crystal panel in a case where holes that differ in size are formed in a color filter and a case where a pigment concentration of the color filter is changed without forming holes.

The NTSC ratio is a value representing the color purity of a color filter (the ratio in a case where the RGB (Red, Green, Blue) area in the NTSC standard is set to 100%).

This graph shows that even when the same brightness is obtained, the color purity in the case where the holes are formed is lower than that in the case where the pigment concentration is changed.

In order to improve the disadvantage of the semi-transmission type liquid crystal display device, therefore, a structure in which two color filters (a first color filter and a second color filter) of similar colors that differ in tone are formed in each of pixel regions has been proposed (see Japanese Laid-open Patent Publication No. 2001-183646).

For example, in a case where color filters are in three colors (Red, Green, and Blue), the first color filter and the second color filter that differ in tone in each of the colors are formed. That is, the structure uses color filters in a total of six colors.

That is, in the pixel region corresponding to the Red filter, a first color filter in dark red and a second color filter in light red are formed.

Similarly, a first color filter and a second color filter whose green colors differ in tone are also formed in the pixel region corresponding to the Green filter, and a first color filter and a second color filter whose blue colors differ in tone are also formed in the pixel region corresponding to the Blue filter.

A first color filter having high color purity, i.e., in a dark color (a color filter having a low light transmission factor) and a second color filter in a light color (a color filter having a high light transmission factor) are respectively arranged in a light transmission region and a light reflection region.

In the above-mentioned structure in which the color filter is provided with the holes, a high reflection factor is achieved by forming the holes in the color filter having high color purity in the light reflection region. On the other hand, the structure using the color filters in six colors is characterized in that the second color filter having a high transmission factor is formed in the light reflection region.

According to the semi-transmission type liquid crystal display device, it is possible to obtain an image quality having high color purity in the transmission mode, and it is possible to obtain an image quality having not only a high reflection factor but also high color purity in the reflection mode.

In the semi-transmission type liquid crystal display device, however, the first color filter and the second color filter are formed in the same pixel region. Therefore, when a boundary between the first color filter and the second color filter occurs in the light transmission region, the boundary may deteriorate the image quality.

That is, when a boundary 11 between the first color filter and the second color filter exists in the light transmission region, the second color filter enters a part of the light transmission region, so that the color purity in the transmission mode is reduced. Further, the white balance may be shifted.

An object of the present invention is to provide a semi-transmission type liquid crystal display device in which a first color filter and a second color filter are formed as color filters of similar colors in one pixel region, which is excellent in white balance and realizes an image quality having a high color purity in a transmission mode and an image quality having a high reflection ratio and a high color purity in a reflection mode and display equipment using the same.

SUMMARY OF THE INVENTION

In a liquid crystal display device according to the present invention, a reflectable metal film having a light transmission hole is formed on an inner surface of a transparent substrate, and a light transmission region for transmitting light from the backlight through the light transmission hole and a light reflection region for reflecting outside light other than the light from the backlight on the metal film are arranged within a single pixel region. A first color filter and a second color filter of similar colors that differ in tone are formed in each of pixel regions on the inner surface of the transparent substrate, and a boundary between the first color filter and the second color filter in each of the pixel regions is positioned in the light reflection region of the pixel region.

The first color filter in the dark color is formed in the pixel region including the light transmission region, and the second color filter in the light color is only formed in the light reflection region in the pixel region.

In the liquid crystal display device having this configuration, a boundary line between the first color filter in the dark color and the second color filter in the light color is set on the light reflection region of the one pixel region, so that the second color filter having optical characteristics suitable for light reflection does not exist in the light transmission region. Consequently, an image quality in a transmission mode can be prevented from being reduced. In a reflection mode, a reflection factor is not substantially reduced. Therefore, it is possible to obtain an image quality excellent in white balance and having high color purity in the transmission mode, while having a high reflection factor and a high color purity in the reflection mode.

The difference in tone of a color can be represented by the respective wavelength distributions of the light transmission factors of the color filters.

Display equipment comprising the above-mentioned liquid crystal display device, driving means for feeding a predetermined signal to a display electrode in the liquid crystal display device, and a predetermined circuit for feeding the predetermined signal to the driving means can be manufactured.

In the liquid crystal display device according to the present invention, a boundary gap where no color filter exists may be formed in the boundary between the first color filter and the second color filter that are formed on the inner surface or inner surfaces of the one and/or the other of the transparent substrates.

A step may exist in the boundary between the first color filter and the second color filter, or either one of the first color filter and the second color filter may rise in the boundary.

Also in these configurations, the second color filter suitable for the light reflection region does not exist in the light transmission region, so that the image quality in the transmission mode can be prevented from being reduced.

The foregoing and other advantages, features and effects of the present invention will become apparent from the following detailed description of the present invention, taking in conjunction with the accompanying drawings.

BRIEF DESCRIPTION OF THE DRAWINGS

FIG. 11 (B) is a cross-sectional view of a color filter portion representing a boundary surface between first and second color filters included in the present invention;

DETAILED DESCRIPTION OF PREFERRED EMBODIMENTS

Figure 1:
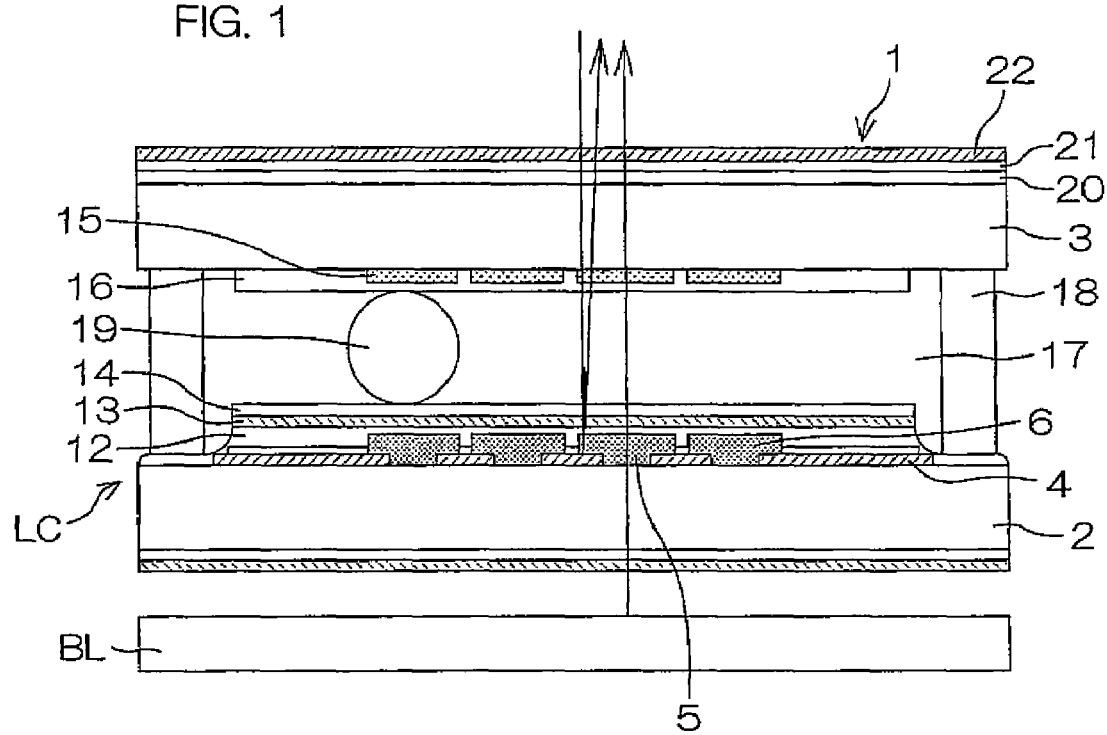
FIG. 1 is a cross-sectional view of a liquid crystal display device according to the present invention.

FIG. 1 is a cross-sectional view of a semi-transmission type liquid crystal display device according to the present invention.

Reference numeral 1 denotes the semi-transmission type liquid crystal display device. The liquid crystal display device 1 comprises a liquid crystal display element LC, and a backlight BL arranged outside thereof so as to irradiate a display region of the liquid crystal display element LC.

Reference numeral 2 denotes one transparent substrate on the common side, and reference numeral 3 denotes an other transparent substrate on the segment side. Each of the transparent substrates 2 and 3 is a glass substrate or the like, and is 420 by 530 mm in dimensions and 0.5 mm thick, for example.

A reflectable metal film having a light transmission hole 5 for transmitting light from the backlight BL is formed on an inner surface of the one transparent substrate 2. A metal film including the light transmission hole 5 is referred to as a semi-transmission film 4.

The semi-transmission film 4 has reflective properties by a metal film composed of chromium, aluminum, silver, AlNd, or their alloys, and has the light transmission hole 5, which has predetermined opening dimensions, and penetrates the film thickness.

The light transmission hole 5 is formed by photolithographic techniques by using a mask having a shape corresponding to the hole 5. That is, the light transmission hole 5 is formed by applying a photosensitive resist to a film surface having a metal film formed thereon and exposing the photosensitive resist to light using the mask for photolithography, followed by the processes of development, etching, and stripping.

The liquid crystal display element LC has a pixel region, and a light reflection region 8 for reflecting outside light other than light from the backlight BL and a light transmission region 7 for transmitting the light from the backlight BL are formed in the pixel region.

The light reflection region 8 is composed of a region where the metal film exists, and the light transmission region 7 is composed of the light transmission hole 5.

One or a plurality of light transmission holes 5 are formed for each of pixel regions corresponding to Red, Green, and Blue. The ratio of the area of the opening to the area of the pixel region is referred to as an "opening ratio". The respective opening ratios for the colors may be the same or differ.

For example, in the case of the same opening ratio, the opening ratio of the light transmission hole 5 formed in the pixel region corresponding to Red, the opening ratio of the light transmission hole 5 formed in the pixel region corresponding to Green, and the opening ratio of the light transmission hole 5 formed in the pixel region corresponding to Blue are respectively taken as 35%.

Consequently, the ratio of the light reflection region 8, where the metal film of the semi-transmission film 4 exists, to the pixel region is 65%, and the ratio of the light transmission region 7, where no metal film exists, to the pixel region is 35%.

A color filter 6 (including the first color filter and the second color filter referred to in the present invention) is formed for each of the pixel regions on the semi-transmission film 4 on the inner surface of the one transparent substrate 2.

The color filter 6 is formed by a pigment dispersion system, that is, by applying a photosensitive resist previously prepared by pigments (Red, Green, Blue) to the substrate 2, followed by photolithography.

An overcoat layer 12 made of acrylic resin and a display electrode 13 made of a large number of ITOs arranged in a stripe shape parallel to one another are formed on the color filter 6. Further, an orientation film 14 composed of polyimide resin rubbed in a predetermined direction is formed on the display electrode 13.

Although the orientation film 14 is formed on the display electrode 13, an insulating film made of resin, SiO$_2$, etc. may be interposed between the orientation film 14 and the display electrode 13.

Although the semi-transmission film 4, the color filter 6, the overcoat layer 12, the display electrode 13, and the orientation film 14 are formed on the transparent substrate 2 in the above-mentioned example, a smoothing film made of resin, SiO$_2$, or the like may be further formed between the semi-transmission film 4 and the color filter 6.

A display electrode 15 made of a large number of ITOs arranged in a striped shape parallel to one another and an orientation film 16 made of polyimide resin rubbed in a predetermined direction, for example, are successively formed on the glass substrate forming the other transparent substrate 3.

An insulating layer made of resin, SiO$_2$, or the like may be interposed between the display electrode 15 and the orientation film 14.

In such a way, both the transparent substrates 2 and 3 are affixed to each other by a seal member 18.

A liquid crystal layer 17 made of a chiral nematic liquid crystal material twisted at an angle of 200° to 260°, for example, is interposed in a space surrounded by the seal member 18 and between the orientation film 14 on the one transparent substrate 2 and the orientation film 16 on the other transparent substrate 3.

A large number of spacers 19 are arranged so as to make the thickness of the liquid crystal layer 17 constant. In this case, as a method for making the thickness constant, a photo spacer made of acrylic resin or the like formed by a photolithographic process may be formed in place of the spacers.

Furthermore, a first phase difference film 20 and a second phase difference film 21 made of polycarbonate or the like and an iodine-based polarizing plate 22 are successively formed outside of the transparent substrate 3. These members are affixed by applying an adhesive made of an acrylic-based material. A phase difference film made of polycarbonate or the like and a polarizing plate are successively formed on the side of the transparent substrate 2.

The backlight BL is arranged outside of the transparent substrate 2.

In the liquid crystal display device 1 having the above-mentioned configuration, light incident from the side of the transparent substrate 3 by exterior illumination such as solar light or a fluorescent lamp passes through the polarizing plate 22, the second phase difference film 21, the first phase difference film 20, and the transparent substrate 3, reaches the semi-transmission film 4 through the liquid crystal layer 17, the color filter 6, and so on, is optically reflected by the semi-transmission film 4, and is emitted toward the display side through the color filter 6, the liquid crystal layer 17, the transparent substrate 3, the first phase difference film 20, the second phase difference film 21, and the polarizing plate 22. This is a reflection mode.

The light from the backlight BL is incident from the side of the transparent substrate 2. The incident light passes through the transparent substrate 2, passes through the liquid crystal layer 17 via the light transmission hole 5 in the semi-transmission film 4, the color filter 6, and so on, and is emitted toward the display side through the transparent substrate 3, the first phase difference film 20, the second phase difference film 21, and the polarizing plate 22. This is a transmission mode.

The liquid crystal display device 1 is incorporated into a "display equipment" comprising driving means such as a driving IC for applying a predetermined potential to the liquid crystal layer 17 through an area between the display electrodes 13 and 15 and a predetermined circuit for supplying the predetermined potential to the driving means, so that an actual display operation is performed.

A configuration in which the three pixel regions, that is, the pixel regions corresponding to Red, Green, and Blue are formed will be then described using FIG. 2 to FIG. 5.

Figure 2:
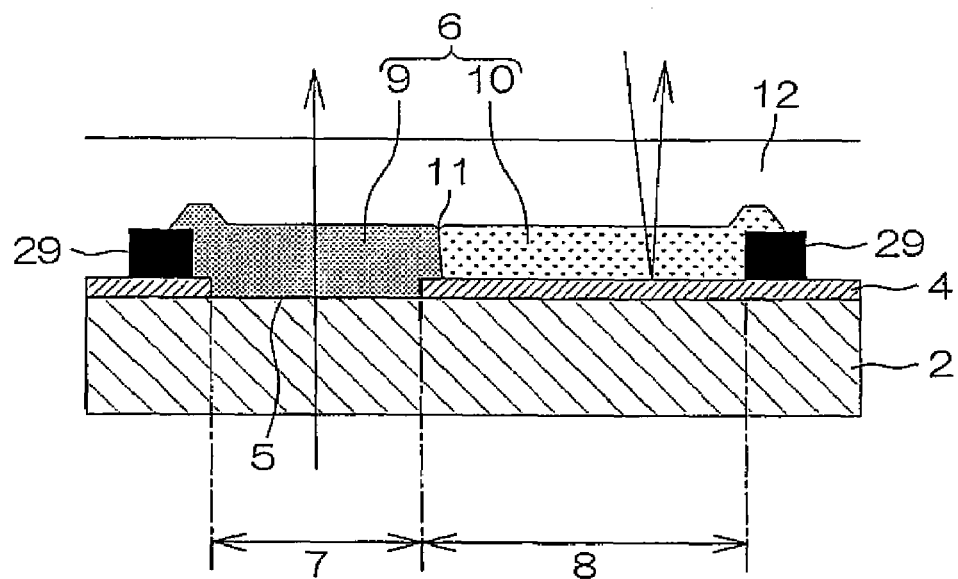
FIG. 2 is a cross-sectional view of a color filter portion in the liquid crystal display device shown in FIG. 1.

FIG. 2 is an enlarged sectional view within the certain pixel region where the color filter is formed.

Figure 3:
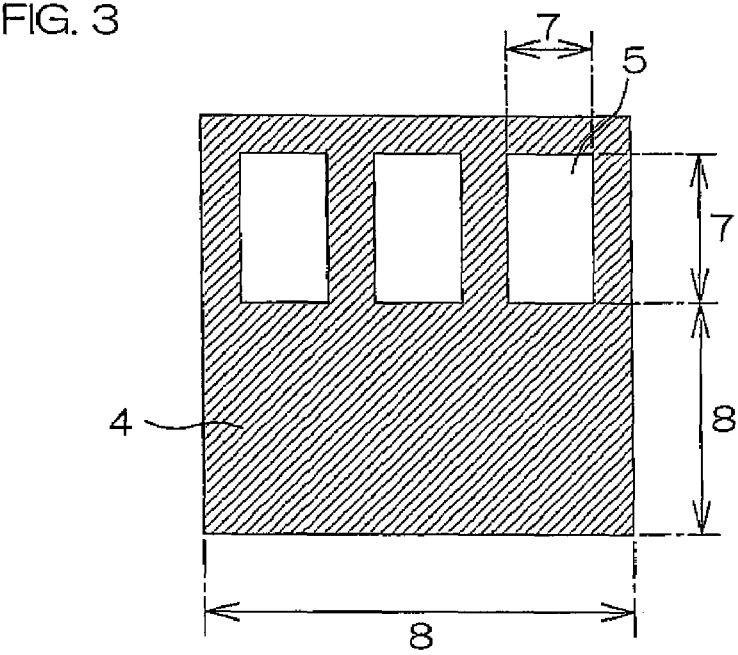
FIG. 3 is a plan view of a metal film in a pixel region.

FIG. 3 is a plan view of the semi-transmission film 4 (composed of the light reflection region 8 and the light transmission region 7) formed in the continuous three pixel regions.

Figure 4:
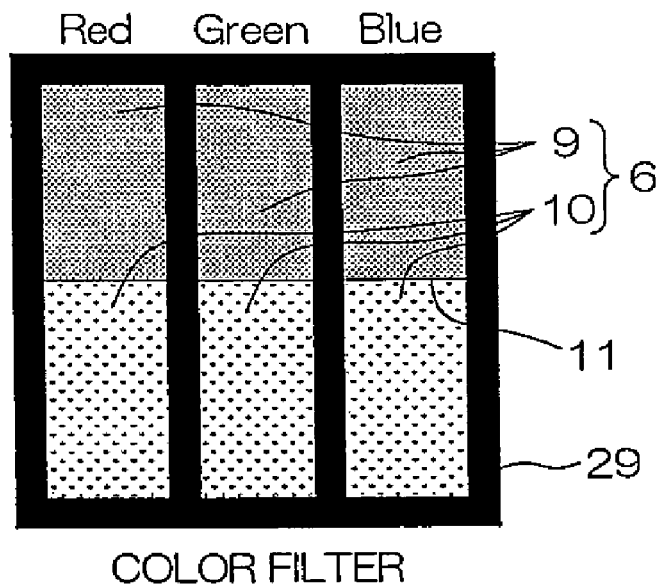
FIG. 4 is a plan view of a color filter formed in a pixel region.
Figure 5:
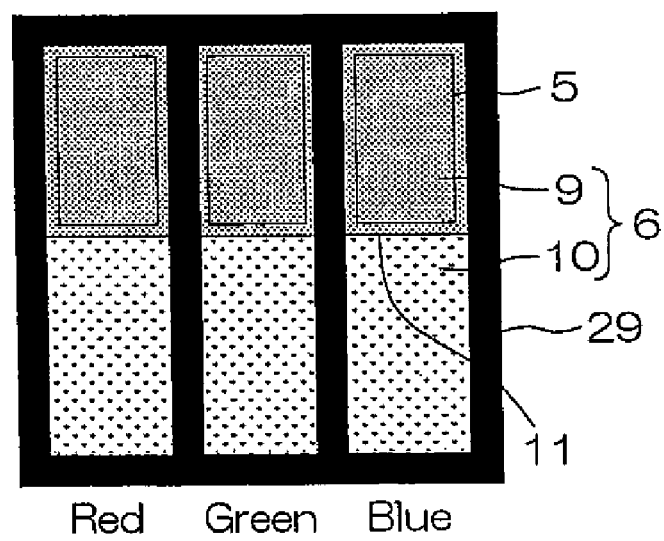
FIG. 5 is a plan view showing a relationship between a reflection metal thin film and a color filter in a pixel region.

FIG. 4 is a plan view showing a state where the color filter 6 is formed in the three pixel regions, and FIG. 5 is a plan view showing a relationship among the light reflection region 8, the light transmission region 7, and the color filter 6.

FIGS. 4 and 5 show a state where a red-based color filter, a green-based color filter, and a blue-based color filter are continuously arranged from the left in the three pixel regions.

A stripe bulkhead 29 made of black resin is formed in a boundary between the individual pixel regions.

The color filter 6 comprises a first color filter 9 in a dark color mainly formed in the light transmission region 7 and a second color filter 10 of a light color of the similar color formed in the light reflection region 8, as shown in FIGS. 2, 4, and 5.

The first color filter 9 is a color filter having a high color purity, i.e., in a dark color (a color filter having a low transmission factor), and the second color filter 10 is a color filter in a light color (a color filter having a high light transmission factor).

The first color filter 9 is formed in at least the light transmission region 7 within the pixel region. A part of the first color filter 9 sticks out from the light transmission region 7 and extends to the light reflection region 8.

The second color filter 10 is formed only in the light reflection region 8 within the pixel region.

Consequently, a boundary 11a between the first color filter 9 and the second color filter 10 in the color filter 6 of similar colors exists in the light reflection region 8, as shown in FIGS. 2 and 5.

In the present embodiment, assuming that the light transmission region 7 has an area of 48 μm by 60 μm, the first color filter 9 covers the light transmission region 7 by making each of the dimensions thereof larger by 5 μm than that of the light transmission region 7 (53 μm by 65 μm).

That is, the first color filter 9 formed in the light transmission region 7 is formed such that the shape thereof is larger within a range of a maximum of 5 μm toward the light reflection region 8, as compared with the shape of the light transmission region 7.

Thus, the second color filter 10 does not exist in a part of the light transmission region 7. This can prevent color purity in the transmission mode from being reduced due to the existence of the color filter 10 having a high light transmission factor.

The amount of stick-out of the first color filter 9 toward the light reflection region 8 is limited to a maximum of 5 μm, so that the reflection factor is substantially not reduced in the reflection mode, and brightness in the reflection mode is not reduced.

In each of the reflection mode and the transmission mode, therefore, the respective transmission factor of each light of the each color filter formed in the each pixel region can be approximated. As a result, an image quality excellent in white balance is obtained. Simultaneously, an image quality having high color purity is obtained in the transmission mode, and an image quality having a high reflection factor and a high color purity can be obtained in the reflection mode.

FIG. 2 shows a case where the first color filter 9 and the second color filter 10 are brought into contact with each other to form the boundary 11.

However, the boundary 11 is not necessarily formed in the invention only when the first color filter 9 and the second color filter 10 formed in the same pixel region are brought into contact with each other, as shown in FIG. 2.

Figure 6:
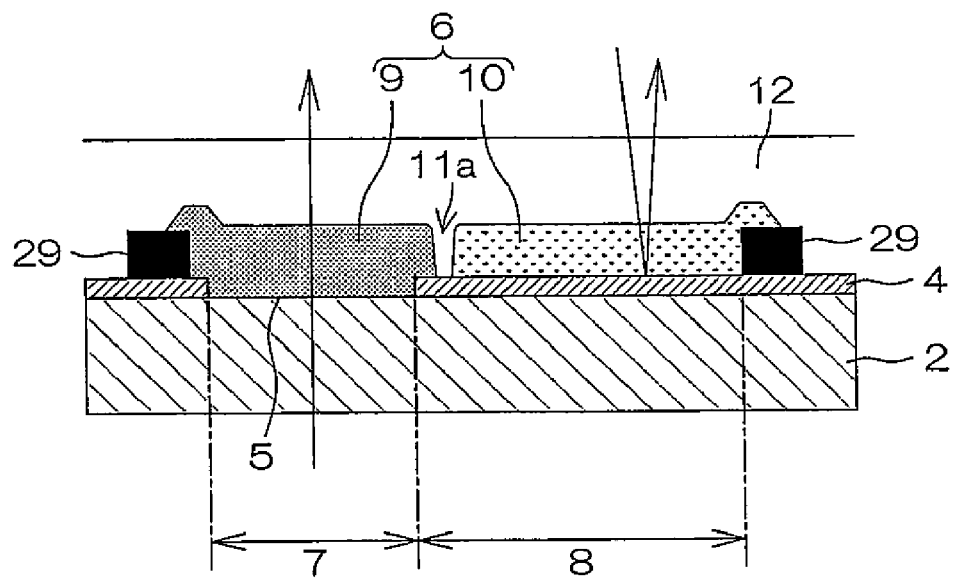
FIG. 6 is a cross-sectional view of a color filter portion in a liquid crystal display device having a space on a boundary surface between first and second color filters.
Figure 11A:
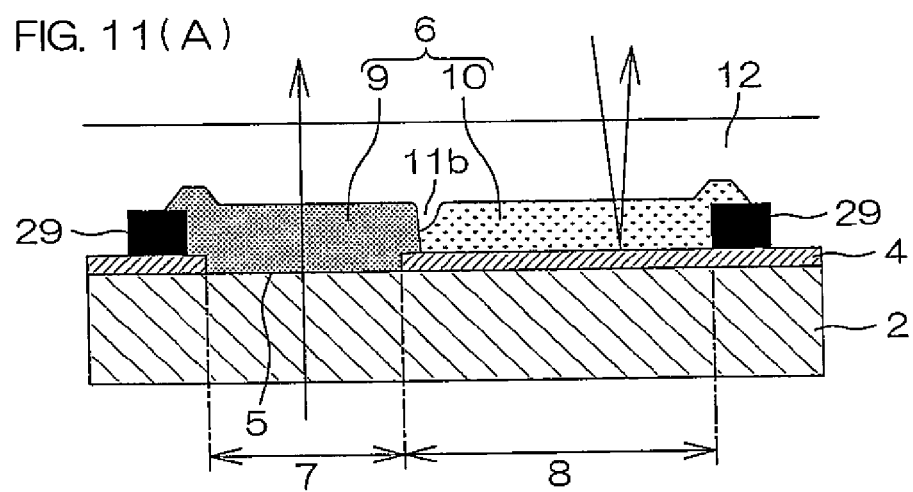
FIG. 11 (A) is a cross-sectional view of a color filter portion representing a boundary surface between first and second color filters included in the present invention.
Figure 11B:
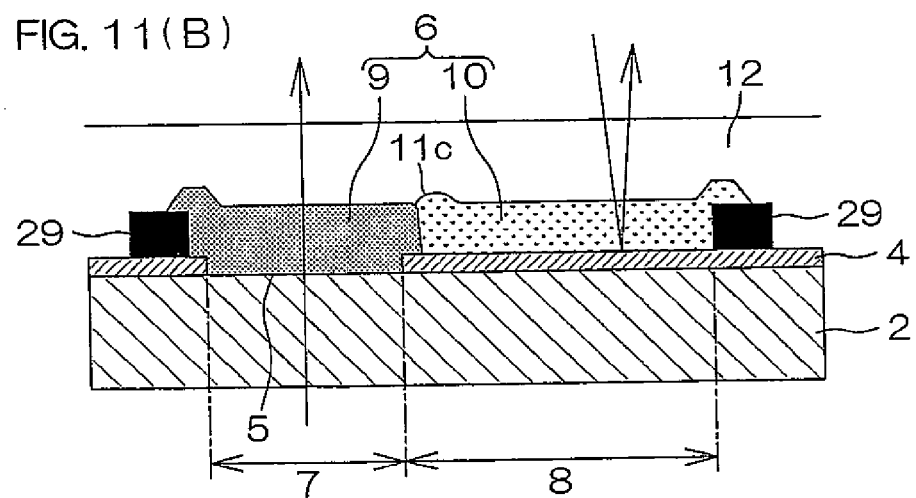
Figure 12A:
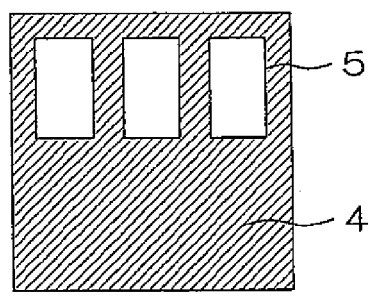
FIGS. 12 (A) to 12 (H) are plan views showing main steps in formation of the color filter-according to the present invention.
Figure 12E:
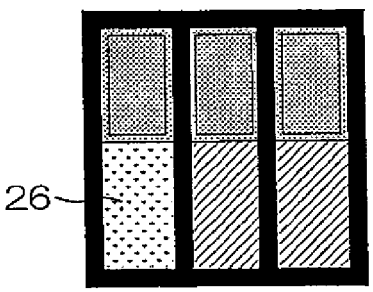
Figure 12B:
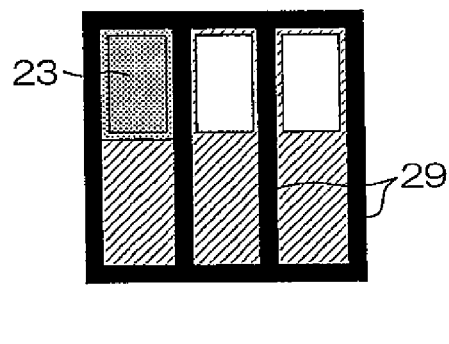
Figure 12F:
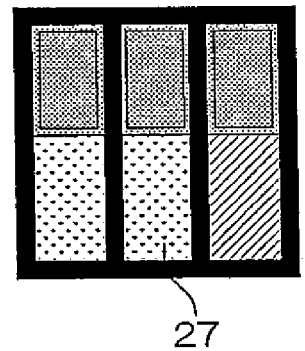
Figure 12C:
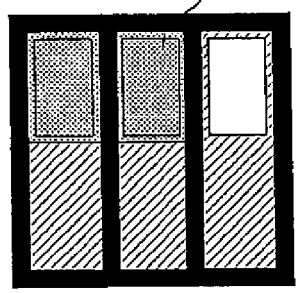
Figure 12G:
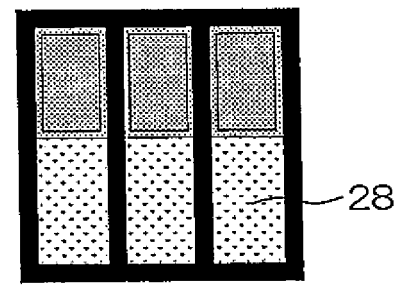
Figure 12D:
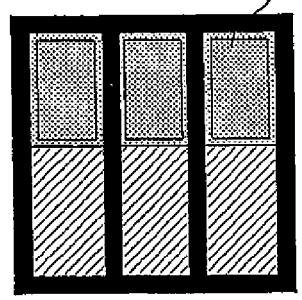
Figure 12H:
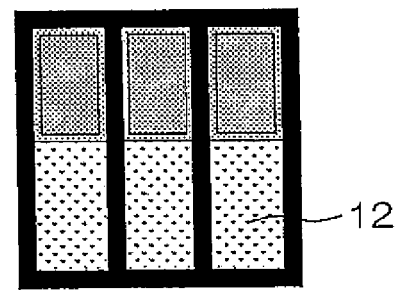

In addition to the foregoing, there are a case where the first color filter 9 and the second color filter 10 are slightly spaced apart from each other within the light reflection region 8 to form a boundary in a clearance as shown in FIG. 6, and a case where the first color filter 9 and the second color filter 10 are partially overlapped with each other within the light reflection region 8 to form a boundary as shown in FIG. 11 (B).

In both of the cases, it is possible to obtain such an effect of the present invention that the color purity in the transmission mode is improved and the reflection factor is substantially not reduced in the reflection mode.

An example in which a boundary is formed in a clearance (hereinafter referred to as a "boundary gap") will be described in detail.

FIG. 6 is an enlarged sectional view showing one pixel region where color filters of similar colors are formed.

Figure 7:
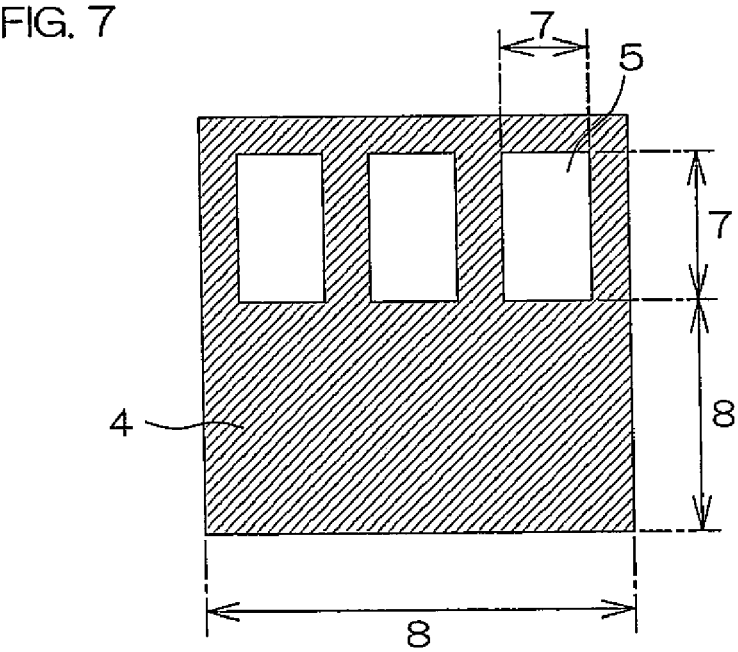
FIG. 7 is a plan view of a metal film in a pixel region.

FIG. 7 is a plan view of a semi-transmission film 4 (comprising a light reflection region 8 and a light transmission region 7) formed in a pixel region.

Figure 8:
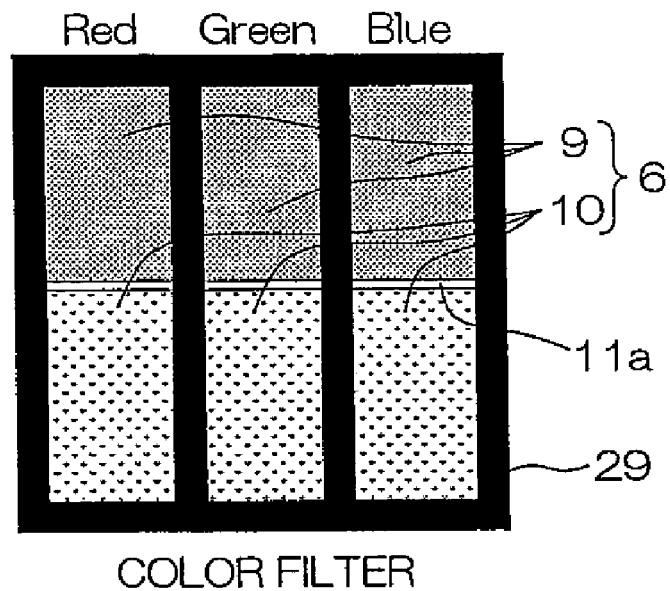
FIG. 8 is a plan view of a color filter formed in a pixel region.
Figure 9:
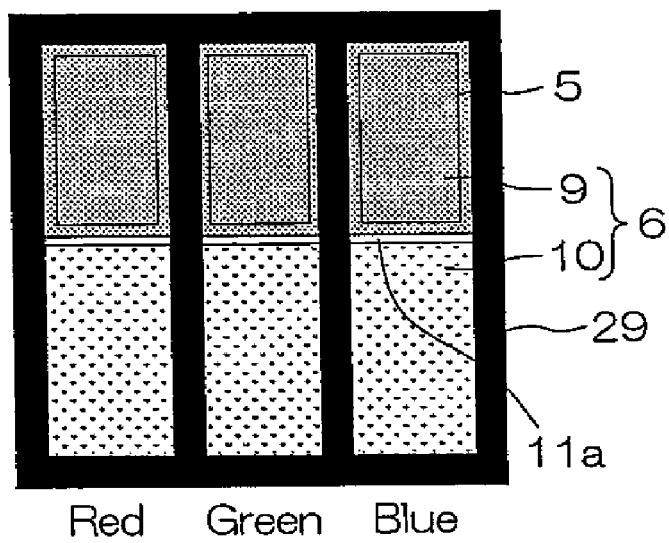
FIG. 9 is a plan view showing a relationship between a reflection metal thin film and a color filter in a pixel region.

FIG. 8 is a plan view showing a state where a color filter 6 is formed in a pixel region, and FIG. 9 is a plan view showing the relationship among a light reflection region 8, a light transmission region 7, and a color filter 6.

The color filter 6 of a similar color is formed in one pixel region. The color filter 6 of a similar color comprises a first color filter 9 in a dark color and a second color filter 10 in a light color.

The first color filter 9 covers the whole of the light transmission region 7 and sticks out from the light transmission region 7.

The second color filter 10 is formed in only the light reflection region 8 apart from an end of the first color filter 9 by a predetermined distance.

In a boundary 11 between the first color filter 9 and the second color filter 10, therefore, a boundary gap 11a where neither one of the color filters is formed exists in the light reflection region 8.

Specific dimensions will be exemplified. The light transmission region 7 has an area of 48 μm by 60 μm, while the first color filter 9 covers the light transmission region 7 by making each of the dimensions thereof larger by 5 μm (53 μm by 65 μm) than that of the light transmission region 7.

The second color filter 10 is formed in the light reflection region 8 apart from the end of the first color filter 9 by a predetermined distance d, e.g., 2.5 μm.

The distance d is in a range from 0 to 5 μm, and preferably in a range from 0 to 2.5 μm.

Even by this configuration, the second color filter 10 does not exist in a part of the light transmission region 7, so that the color purity in the transmission mode is never reduced.

Since the amount of stick-out of the first color filter 9 toward the light reflection region 8 is limited to a maximum of 5 μm, the reflection factor is not substantially reduced in the reflection mode.

Since the width d of the boundary gap 11a is also limited to a maximum of 5 μm, the color purity is not substantially reduced in the reflection mode.

Even in the embodiment having the boundary gap 11a, therefore, an image quality excellent in white balance and having a high color purity in the transmission mode, while having a high reflection factor and a high color purity in the reflection mode is obtained.

The configuration of the liquid crystal display device according to the present invention is not limited to that in the above-mentioned embodiment. Various changes can be made without departing from the scope of the present invention.

For example, three types of filters corresponding to R (red), G (green), and B (blue) are used as examples of the above-mentioned color filter 6, three types of filters corresponding to yellow, cyan, and magenta may be used.

Figure 10:
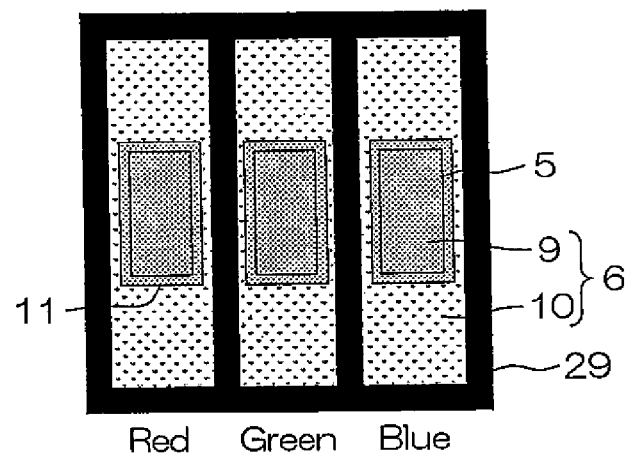
FIG. 10 is a plan view showing an other relationship between a reflection metal thin film and a color filter in a pixel region.

Although in the above-mentioned embodiment, an example in which one pixel region is divided into two parts of the first color filter and the second color filter is illustrated, in the present invention the boundary 11 between the first color filter and the second color filter may be positioned in the light reflection region of the pixel region. Consequently, the present invention holds even in a configuration in which a light transmission hole 5 is at a relatively central part of a pixel region, the light transmission hole 5 is covered with a first color filter 9, and a second color filter 10 is formed around the first color filter 9, as shown in FIG. 10.

Even in a case where only a part of a second color filter 10 is brought into contact with a boundary between a first color filter 9 and the second color filter 10 so that a step occurs therebetween as shown in FIG. 11 (A), such an effect of the present invention that an image quality excellent in white balance and having a high color purity in a transmission mode, and a high reflection factor and a high color purity in a reflection mode can be achieved.

Even in a case where either one of a first color filter 9 and a second color filter 10 rises in a boundary between the first color filter 9 and the second color filter 10, as shown in FIG. 11 (B), the effect of the present invention can be similarly achieved.

Although in the above-mentioned embodiment the color filter 6 is formed directly on the semi-transmission film 4 or with the insulating film by being coated on the inner surface of the one transparent substrate 2, it may be formed on the side of the other transparent substrate 3.

Although description was made by taking as an example a passive-type color liquid crystal display device, the present invention is not limited to the same. For example, the present invention is also applicable to an active type color liquid crystal display device comprising a switching element in each of pixel regions and further to a bistable type liquid crystal display device, in whichever case the same function and effect are obtained.

A method of forming a semi-transmission film and a color filter in the present invention will be described on the basis of FIGS. 12 (A) to 12 (H) along the order of steps by paying attention to three continuous pixel regions.

Step (A): Deposition and Etching of a Metal Film

A reflectable metal film serving as a semi-transmission film 4 is formed on an entire glass substrate. The metal film is an AlNd film, for example, and is formed by sputtering such that the thickness thereof will be 1250 Å.

Light transmission holes 5 are then respectively formed in pixel regions corresponding to Red, Green, and Blue in the metal film by a photolithographic process.

Each of the pixel regions comprises a light transmission region 7 having the light transmission hole 5 and a light reflection region 8 formed with the residual metal film. A semi-transmission type liquid crystal display device having both light transmission properties and light reflection properties can be manufactured by setting a ratio of the areas of the light transmission region 7 and the light reflection region 8 in each of the pixel regions.

Step (B): Formation of a Stripe Bulkhead 29 Composed of Black Resin and Formation of a Red Resist Serving as a First Color Filter A photosensitive resist prepared with a black pigment is applied on the substrate in accordance with a pigment dispersion system, and the stripe bulkhead 29 is then formed in a boundary between the adjacent pixel regions by photolithography.

A photosensitive resist prepared with a red pigment in accordance with a pigment dispersion system and serving as a first color filter 9 in a dark red-based color is then applied on the substrate.

A first color filter 23 in a dark red-based color is then formed in an area corresponding to the light transmission region 7 of the pixel region where a red-based color filter 6 is to be formed (one of the three pixel regions, i.e., the pixel region on the left side in the figure) by photolithography.

At this time, the first color filter 23 is extended to the light reflection region 8 beyond the light transmission region 7 such that a boundary 11a to a second color filter 10 of a similar color and in a light red-based color is positioned on the light reflection region 8. That is, the Red resist is formed in a region larger than the opening area of the light transmission hole 5, to completely cover the light transmission region 7.

Step (C): Formation of a Green Resist Serving as a First Color Filter

A photosensitive resist serving as a first color filter 9 in a dark green-based color is applied on the substrate, and is then disposed in an area corresponding to the light transmission region 7 of the pixel region where a green-based color filter 6 is to be formed (one of the three pixel regions, i.e., the pixel region at the center in the figure) by photolithography. Thus, a first color filter 24 in a dark green-based color is formed.

At this time, the first color filter 24 is extended to the light reflection region 8 beyond the light transmission region 7 such that a boundary 11a to a second color filter 10 of a similar color and in a light green-based color is positioned on the light reflection region 8. That is, the Green resist is formed in a region larger than the opening area of the light transmission hole 5, to completely cover the light transmission region 7.

Step (D): Formation of a Blue Resist Serving as a First Color Filter

A photosensitive resist, prepared with a blue pigment in accordance with a pigment dispersion system, serving as a first-color filter 9 in a dark blue-based color is applied on the substrate, and is then disposed in an area corresponding to the light transmission region 7 of the pixel region where a blue-based color filter 6 is to be formed (one of the three pixel regions, i.e., the pixel region on the right in the figure) by photolithography. Thus, a first color filter 25 in a dark blue-based color is formed.

At this time, the first color filter 25 is extended to the light reflection region 8 beyond the light transmission region 7 such that a boundary 11a to a second color filter 10 of a similar color and in a light blue-based color is positioned on the light reflection region 8. That is, the Blue resist is formed in a region larger than the opening area of the light transmission hole 5, to completely cover the light transmission region 7.

Step (E): Formation of a Red Resist Serving as a Second Color Filter

A second color filter 10 is formed in a light reflection region 8 of a pixel region where a red-based color filter 6 is to be formed.

A photosensitive resist prepared with a red pigment is prepared such that the pigment concentration thereof is lower than that of the resist serving as the first color filter 23, to achieve a high transmission factor.

This resist is applied on the substrate, and is then disposed in an area corresponding to the light reflection region 8 by photolithography. Thus, the resist serves as a second color filter 26 in a light red-based color.

At this time, the second color filter 26 is not formed in the light reflection region 8 where the first red-based color filter 23 is formed in the foregoing step (B), and is formed in only a resist unformed region on the light reflection region 8.

At this time, the second color filter 26 is formed in contact with the end of the first color filter 23 formed in the step (B) as shown in FIG. 2, or is formed in the light reflection region 8 apart from the end of the first color filter 23 (provided with the boundary gap 11a) as shown in FIG. 6.

In the latter case where the boundary gap 11a is provided, the second color filter 26 is not superimposed on the first color filter. Accordingly, margin can be taken under mask design and process conditions, so that improvement in yield and reduction in cost can be expected.

As a result, the boundary 11 or the boundary gap 11a between the first color filter 23 and the second color filter 26 exists within the light reflection region 8.

Step (F): Formation of a Green Resist Serving as a Second Color Filter

A second color filter 10 is formed in a light reflection region 8 in a pixel region where a green-based color filter 6 is to be formed.

A photosensitive resist prepared with a green pigment is prepared such that the pigment concentration thereof is lower than that of the resist serving as the first color filter 24, to achieve a high transmission factor.

This resist is applied on the substrate, and is then disposed in an area corresponding to the light reflection region 8 by photolithography. Thus, the resist serves as a second color filter 27 in a light green-based color.

At this time, the second color filter 27 is not formed in the light reflection region 8 where the first green-based color filter 24 is formed in the foregoing step (C), and is formed in only a resist unformed region on the light reflection region 8.

At this time, the second color filter 27 is formed in contact with the end of the first color filter 23 formed in the step (B) as shown in FIG. 2, or is formed in the light reflection region 8 apart from the end of the first color filter 23 (provided with the boundary gap 11a) as shown in FIG. 6.

Step (G): Formation of a Blue Resist Serving as a Second Color Filter

A second color filter 10 is formed in a light reflection region 8 of a pixel region where a blue-based color filter 6 is to be formed.

A photosensitive resist prepared with a green pigment is prepared such that the pigment concentration thereof is lower than that of the resist serving as the first color filter 25, to achieve a high transmission factor.

The resist is applied on the substrate, and is then disposed in an area corresponding to the light reflection region 8 by photolithography. Thus, the resist serves as a second color filter 28 in a light blue-based color.

At this time, the second color filter 28 is not formed in the light reflection region 8 where the first blue-based color filter 25 is formed in the foregoing step (D), and is formed in only a resist unformed region on the light reflection region 8.

At this time, the second color filter 28 is formed in contact with the end of the first color filter 23 formed in the step (B) as shown in FIG. 2, or is formed in the light reflection region 8 apart from the end of the first color filter 23 (provided with the boundary gap 11a) as shown in FIG. 6.

Step (H): Formation of an Overcoat Layer

Acrylic resin is applied to the three pixel regions formed in the foregoing manner, to form an overcoat layer 12. The overcoat layer 12 is formed in a thickness of 1.5 to 4.0 μm, and is formed such that a surface step after application will be not more than 0.1 μm.

The order of formation of Red, Green, and Blue is not particularly determined. The order of formation of the first color filter 9 (23, 24, 25) in the dark color and the second color filter 10 (26, 27, 28) in the light color is not particularly determined.

Next, RGB design of the first color filter 9 and the second color filter 10 in the semi-transmission type liquid crystal display device according to the present invention will be described below.

Figure 13:
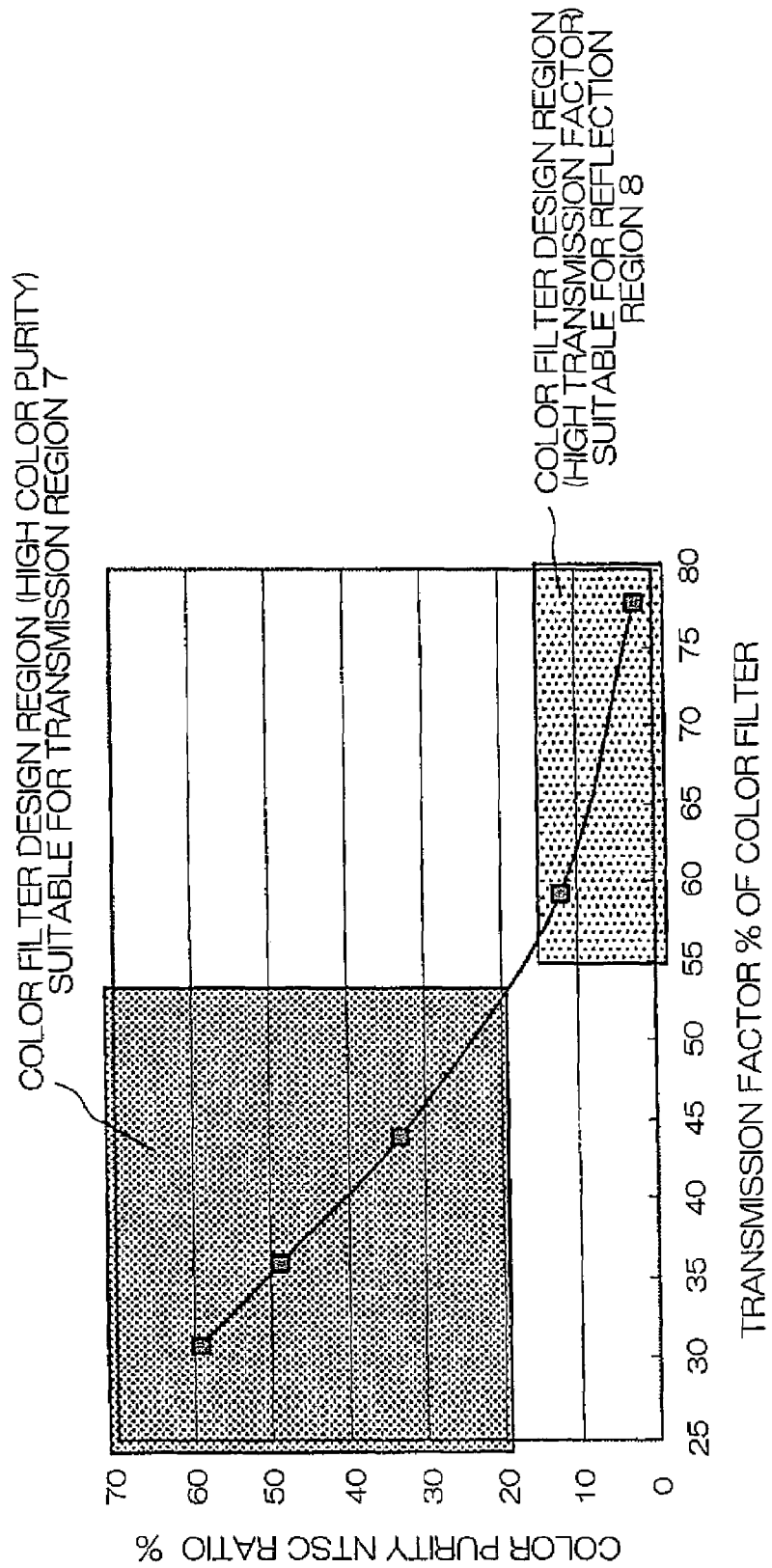
FIG. 13 is a characteristic diagram showing the relationship between a transmission factor and color purity in color filter chromaticity design.

FIG. 13 shows the relationship between the transmission factor of the color filter and the NTSC ratio. The transmission factor is an average value of the respective transmission factors of Red, Green, and Blue, and the NTSC ratio is a value representing the color purity of the color filter (the ratio in a case where the RGB area in the NTSC standard is taken as 100%).

Figure 14:
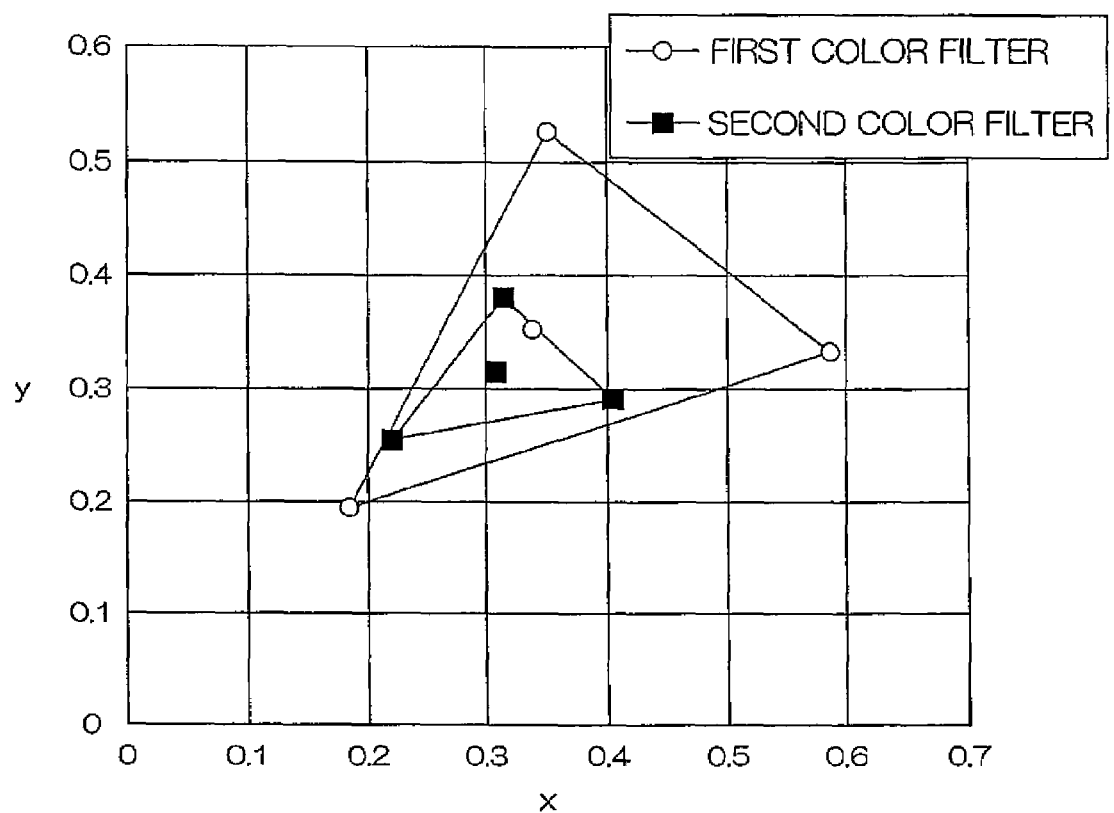
FIG. 14 is a characteristic diagram showing CIE chromaticity in an example.

FIG. 14 is a CIE color diagram and a wavelength spectrum diagram in the color filter design carried out in the present embodiment.

It is desirable that the first color filter 9 formed in the light transmission region 7 has a high color purity, so that the NTSC ratio thereof is not less than 20%.

Although the increase in color purity causes a transmission factor in a trade-off relationship therewith to be reduced, measures such as increasing the area of a light transmission hole 5 of a metal semi-transmission film are carried out.

In the present embodiment, a color filter having an NTSC ratio of 60% is formed as the first color filter 9.

On the other hand, it is desirable that the second color filter 10 formed in the light reflection region 8 is a color filter having a high transmission factor. Although the increase in transmission factor causes color purity in a trade-off relationship therewith to be reduced, light passes through the color filter two times in the reflection mode. Therefore, an NTSC ratio that is not less than that of the single color filter can be realized.

It is desirable that the transmission factor is not less than 55%, and the NTSC ratio is not more than 10%. In the present embodiment, a color filter having a transmission factor of 58% and an NTSC ratio of 6% is formed.

In a case where the boundary gap 11a having no color filter formed therein is formed in the light reflection region 8, a light reflection factor is improved, while a color purity is reduced. Therefore, it is considered that the color purity is increased by reducing the transmission factor. It is desirable that the transmission factor is not less than 50% and the NTSC ratio is not more than 20%.

EXAMPLE

The inventors of the present invention produced a substrate 3 having color filters by steps shown in FIGS. 12 (A) to 12 (H) to manufacture a liquid crystal display device 1 having a configuration shown in FIG. 1, and measured the optical characteristics of the image quality thereof. As a comparative example, the inventors measured the optical characteristics of the image quality of a conventional configuration in which a hole was formed in a color filter having a high color purity.

Figure 15:
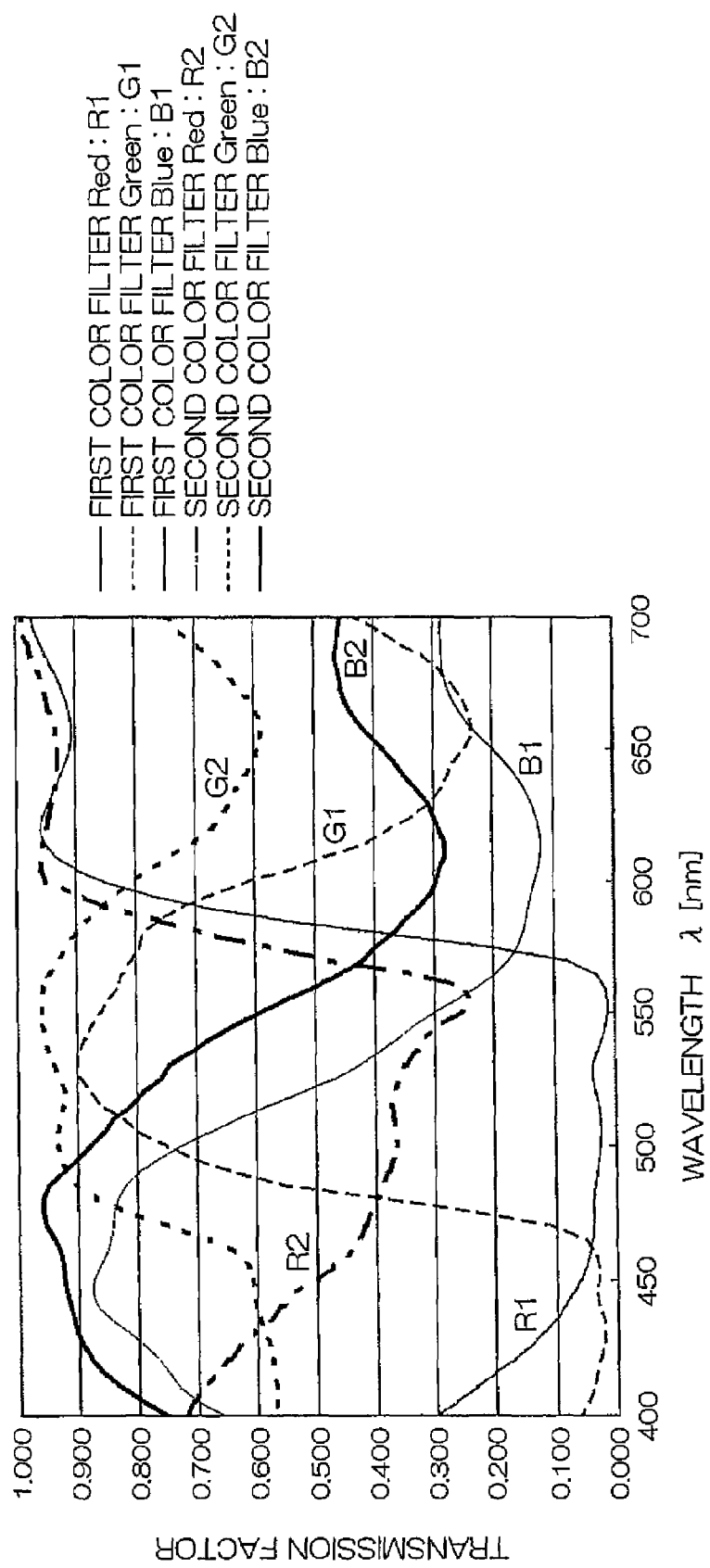
FIG. 15 is a graph showing results of measurement of a wavelength spectrum in an example.
Figure 16:
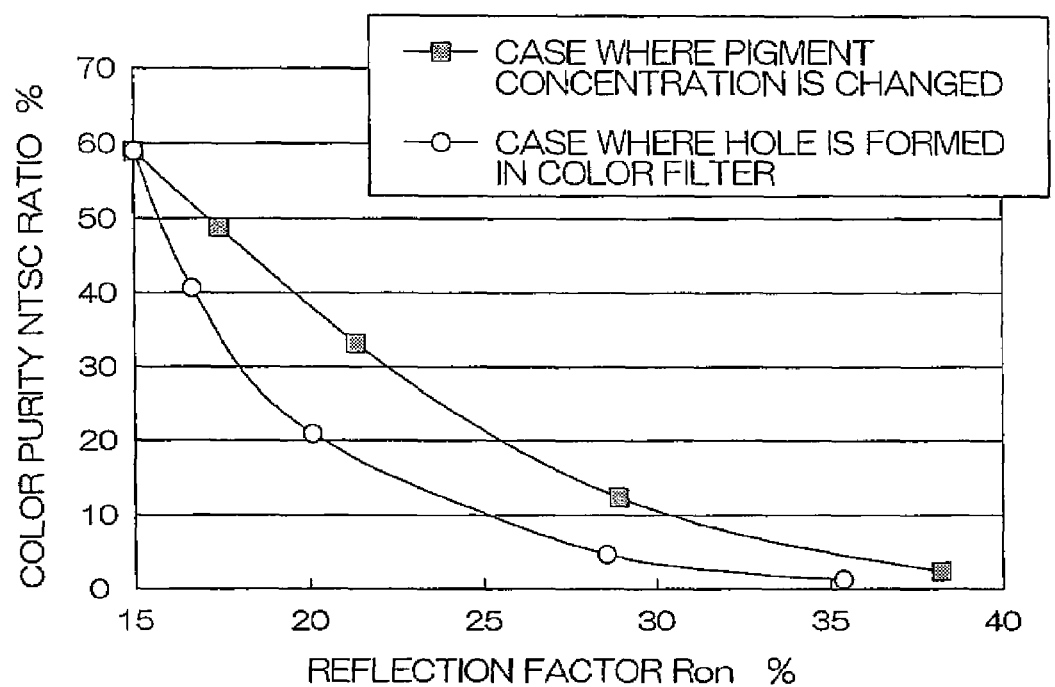
FIG. 16 is a characteristic diagram showing a general relationship between a reflection factor and color purity in a color filter structure of a liquid crystal display device.

FIG. 15 is a graph showing results of measurement of respective wavelength spectra of the first color filter 9 and the second color filter 10 in the present embodiment. R1 represents the light transmission factor of the first color filter in red 9, and R2 represents the light transmission factor of the second color filter in red 10. G1 represents the light transmission factor of the first color filter in green 9, G2 represents the light transmission factor of the second color filter in green 10, B1 represents the light transmission factor of the first color filter in blue 9, and B2 represents the light transmission factor of the second color filter in blue 10. The second color filter 10 is prepared such that the pigment concentration is lower and the transmission factor is higher than those of the first color filter. As a result, the light transmission factor of the first color filter is as a whole lower than the light transmission factor of the second color filter.

Table 1 shows the results of the measurement of the optical characteristics of the image quality of the liquid crystal display device 1 according to the present invention.

TABLE 1

|  |  | Conventional product | | | Product in present invention | | |
|---|---|---|---|---|---|---|---|
|  |  | Y | x | y | Y | x | y |
| Transmission Mode | White | 50.1 | 0.292 | 0.305 | 52.1 | 0.292 | 0.310 |
|  | Black | 2.23 | 0.251 | 0.226 | 2.27 | 0.280 | 0.230 |
|  | Red | 10.5 | 0.485 | 0.324 | 10.8 | 0.483 | 0.324 |
|  | Green | 26.6 | 0.342 | 0.485 | 27.1 | 0.342 | 0.490 |
|  | Blue | 14.9 | 0.180 | 0.167 | 15.2 | 0.181 | 0.169 |
|  | Luminance | 50.1 cd/m2 | | | 52.1 cd/m2 | | |
|  | Contrast | 22.5 | | | 23.0 | | |
|  | NTSC ratio | 22.6% | | | 22.7% | | |
| Reflection mode | White | 19.19 | 0.366 | 0.377 | 20.1 | 0.336 | 0.368 |
|  | Black | 1.25 | 0.326 | 0.212 | 1.17 | 0.321 | 0.190 |
|  | Red | 4.98 | 0.451 | 0.309 | 4.92 | 0.456 | 0.278 |
|  | Green | 10.37 | 0.341 | 0.408 | 10.48 | 0.311 | 0.445 |
|  | Blue | 3.78 | 0.291 | 0.257 | 4.28 | 0.237 | 0.229 |
|  | Reflection factor | 19.2% | | | 20.1% | | |
|  | Contrast | 15.4 | | | 17.2 | | |
|  | NTSC ratio | 7.2% | | | 13.8% | | |

It is found that in the liquid crystal display device 1 according to the present invention, the compatibility between the reflection factor and the color purity (the NTSC ratio) in the reflection mode is improved, as compared with that in the conventional configuration.

In Tables 1 and 2, Yxy indicates the index of a color determined by CIE (Commission Internationale del'Eclairage). Y indicates the brightness (intensity) of the color, and x and y indicates a color and a tone of the color that can be derived from xy plane coordinates (Color Diagram) and its tone.

The reflection factor and the NTSC ratio have been conventionally in a trade-off conflicting relationship.

In Table 1, the reflection factor, and the NTSC ratio are respectively 19.2% and 7.2% in a conventional product as a comparative example, while being respectively 20.1% and 13.8% in a product of the present invention, which were both improved. The fact that both the reflection factor and the NTSC ratio that generally conflict with each other are improved, or the fact that even if one of them is improved, the other is not recognized to be reduced is referred to as "the compatibility is improved".

In the semi-transmission type liquid crystal display device according to the present invention, the boundary 11 between the first color filter 9 and the second color filter 10 was arranged in the light reflection region 8, so that a semi-transmission type liquid crystal display device of an image quality having a high color purity in a transmission mode, while having a high reflection factor and a high color purity in a reflection mode was realized.

A liquid crystal display device 1 having a configuration in which a boundary gap 11a having no color filter formed between the first color filter 9 and the second color filter 10 was located in the light reflection region 8 was then manufactured, to measure the optical characteristics of the image quality thereof.

Table 2 shows the results of the measurement of the optical characteristics of the image quality of the liquid crystal display device 1 according to the present invention.

TABLE 2

|  |  | Conventional product | | | Product in present invention | | |
|---|---|---|---|---|---|---|---|
|  |  | Y | x | y | Y | x | y |
| Transmission Mode | White | 50.1 | 0.292 | 0.305 | 52.1 | 0.292 | 0.310 |
|  | Black | 2.23 | 0.251 | 0.226 | 2.27 | 0.280 | 0.230 |
|  | Red | 10.5 | 0.485 | 0.324 | 10.8 | 0.483 | 0.324 |
|  | Green | 26.6 | 0.342 | 0.485 | 27.1 | 0.342 | 0.490 |
|  | Blue | 14.9 | 0.180 | 0.167 | 15.2 | 0.181 | 0.169 |
|  | Luminance | 50.1 cd/m2 | | | 52.1 cd/m2 | | |
|  | Contrast | 22.5 | | | 23.0 | | |
|  | NTSC ratio | 22.6% | | | 22.7% | | |
| Reflection mode | White | 19.19 | 0.366 | 0.377 | 22.5 | 0.336 | 0.368 |
|  | Black | 1.25 | 0.326 | 0.212 | 1.43 | 0.321 | 0.190 |
|  | Red | 4.98 | 0.451 | 0.309 | 5.60 | 0.425 | 0.302 |
|  | Green | 10.37 | 0.341 | 0.408 | 11.34 | 0.311 | 0.385 |
|  | Blue | 3.78 | 0.291 | 0.257 | 5.45 | 0.243 | 0.240 |
|  | Reflection factor | 19.2% | | | 22.5% | | |
|  | Contrast | 15.4 | | | 15.7 | | |
|  | NTSC ratio | 7.2% | | | 7.0% | | |

In Table 2, approximately the same value (approximately 7%) is maintained as the NTSC ratio, while the reflection factor can be greatly improved from 19.2% to 22.5%.

Even in the liquid crystal display device 1 according to the present invention, therefore, it is not recognized as compared with the conventional configuration that one of the reflection factor and the color purity (the NTSC ratio) in the reflection mode is improved and the other is reduced. Therefore, it can be said that the compatibility therebetween is improved.

In the semi-transmission type liquid crystal display device according to the present invention, the boundary gap 11a having no color filter formed between the first color filter 9 and the second color filter 10 was located in the light reflection region 8, so that a semi-transmission type liquid crystal display device of an image quality having a high color purity in a transmission mode, while having a high reflection factor and a high color purity in a reflection mode was realized.

The invention claimed is:

1. A liquid crystal display element wherein a plurality of pixel regions are formed, comprising:
   a first transparent substrate having a first display electrode;
   a second transparent substrate having a second display electrode;
   a liquid crystal layer disposed between the first transparent substrate and the second transparent substrate;
   a semi-transmission film disposed on at least either side of the first transparent substrate and the second transparent substrate in each of the pixel regions, the semi-transmission film including a light transmission region and a light reflection region; and
   a color filter disposed on at least either side of the first transparent substrate and the second transparent substrate in each of the pixel regions, the color filter including a first color filter and a second color filter having a higher light transmission factor than the first color filter, wherein a boundary between the first color filter and the second color filter in each of the pixel regions is positioned in the light reflection region in each of the pixel region.

2. The liquid crystal display element according to claim 1, wherein the first color filter is disposed in a region including the light transmission region, and the second color filter is only disposed in the light reflection region.

3. The liquid crystal display element according to claim 2, wherein the first color filter is disposed in a region including whole of the light transmission region.

4. The liquid crystal display element according to claim 1, wherein the first color filter has a NTSG ratio, of 20% or more, and the second color filter has a NTSC ratio of 10% or less.

5. The liquid crystal display element according to claim 1, wherein the boundary between the first color filter and the second color filter has a boundary gap.

6. The liquid crystal display element according to claim 5, wherein the boundary gap is 5 micro meters or less.

7. The liquid crystal display element according to claim 1, wherein the boundary between the first color filter and the second color filter has a step.

8. The liquid crystal display element according to claim 1, wherein in the boundary, any one of the first color filter and the second color filter is rising.

9. The liquid crystal display element according to claim 1, wherein the semi-transmission film is a reflectable metal film having a hole, and a ratio of the hole to the pixel region is substantially same in every pixel regions.

10. The liquid crystal display element according to claim 1, further comprising a resin film disposed between the semi-transmission film and the color filter.

11. The liquid crystal display element according to claim 1, wherein the boundary between the first color filter and the second color filter is apart from a boundary of the light transmission region and the light reflection region by 5 micro meters or less.

12. A liquid crystal display device having a liquid crystal display element wherein a plurality of pixel regions are formed and a backlight that is opposing to the liquid crystal display element, the liquid crystal display element comprising:
    a first transparent substrate having a first display electrode;
    a second transparent substrate having a second display electrode;
    a liquid crystal layer disposed between the first transparent substrate and the second transparent substrate;
    a semi-transmission film disposed on at least either side of the first transparent substrate and the second transparent substrate in each of the pixel regions, the semi-transmission film including a light transmission region and a light reflection region; and
    a color filter disposed on at least either side of the first transparent substrate and the second transparent substrate in each of the pixel regions, the color filter including a first color filter and a second color filter having a higher light transmission factor than the first color filter,
    wherein a boundary between the first color filter and the second color filter in each of the pixel regions is positioned in the light reflection region in each of the pixel region.

13. Display equipment comprising a liquid crystal display device, and driving IC for feeding a predetermined signal to a display electrode of the liquid crystal display device, the liquid crystal display device having a liquid crystal display element wherein a plurality of pixel regions are formed and a backlight that is opposing to the liquid crystal display element, the liquid crystal display element comprising:
    a first transparent substrate having a first display electrode;
    a second transparent substrate having a second display electrode;
    a liquid crystal layer disposed between the first transparent to substrate and the second transparent substrate;
    a semi-transmission film disposed on at least either side of the first transparent substrate and the second transparent substrate in each of the pixel regions, the semi-transmission film including a light transmission region and a light reflection region; and
    a color filter disposed on at least either side of the first transparent substrate and the second transparent substrate in each of the pixel regions, the color filter including a first color filter and a second color filter having a higher light transmission factor than the first color filter,
    wherein a boundary between the first color filter and the second color filter in each of the pixel regions is positioned in the light reflection region in each of the pixel region.

* * * * *